T. I. DUFFY.
TIRE CARRIER BRACKET.
APPLICATION FILED AUG. 24, 1912.
1,092,566.
Patented Apr. 7, 1914.
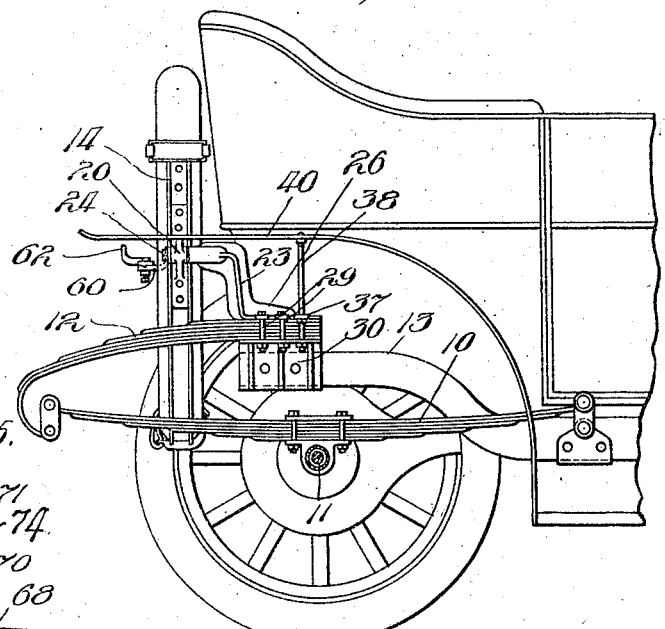
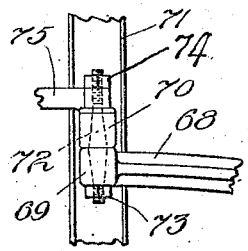
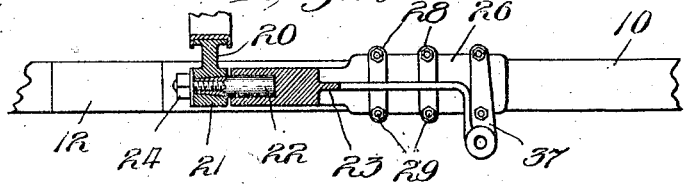
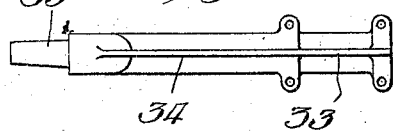
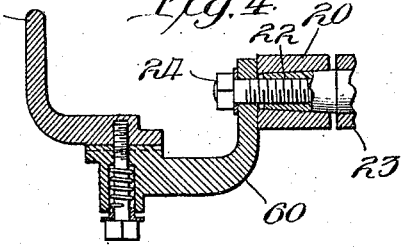
Witnesses:
Harry S. Gaither
J. E. Dowle
Inventor:
Thomas I. Duffy
by William L. Hall
Atty

UNITED STATES PATENT OFFICE.

THOMAS I. DUFFY, OF CHICAGO, ILLINOIS, ASSIGNOR TO E. C. SALES CO., OF CHICAGO, ILLINOIS, A CORPORATION OF ILLINOIS.

TIRE-CARRIER BRACKET.

1,092,566.  Specification of Letters Patent.  Patented Apr. 7, 1914.

Application filed August 24, 1912. Serial No. 716,905.

*To all whom it may concern:*

Be it known that I, THOMAS I. DUFFY, a citizen of the United States, and a resident of Chicago, in the county of Cook and State of Illinois, have invented certain new and useful Improvements in Tire-Carrier Brackets; and I do hereby declare that the following is a clear, full, and exact description thereof, reference being had to the accompanying drawings, and to the characters of reference marked thereon, which form part of this specification.

This invention relates to improved means for supporting tire carriers on motor vehicles and refers more specifically to novel devices in the nature of brackets for supporting a tire carrier or support from the rear end of the vehicle. The said brackets or supporting devices are also arranged so as to provide means for carrying a tail lamp and license sign.

The invention consists in the matters hereinafter set forth and more particularly pointed out in the appended claims.

In the drawings, Figure 1 is a partial side elevation, with the rear axle shown in section, of a motor vehicle equipped with a tire carrier provided with my improved means for supporting the same from the vehicle. Fig. 2 is a partial plan and partial sectional view of one form of combined carrier supporting bracket and spring clip tie, showing the manner of attaching the same to the rear spring of the vehicle. Fig. 3 is a plan view of a modified form of combined carrier supporting bracket and spring clip tie. Fig. 4 is a sectional detail illustrating the manner of mounting a lamp and license sign bracket on the tire carrier bracket. Fig. 5 is a detail showing a slightly different arrangement of supporting the tire carrier and lamp bracket from the tire carrier supporting bracket.

My improved tire carrier supporting and attaching bracket is shown in Fig. 1 as applied to a motor vehicle having three-quarter rear elliptical springs, the lower members 10 of which are suitably clipped to the rear axle 11 of the vehicle, and the upper members 12 of which are attached to the frame bars 13 at the rear end of the body of the vehicle by a clip device hereinafter to be described. The tire carrier 14 may be of any preferred type to receive and support a spare tire or spare wheel. A type of such carrier is shown in my co-pending application for U. S. Letters Patent, Serial No. 704,629, filed June 19, 1912, of which this application is a continuation as to structures common therein.

The carrier 14 is shown as provided with fittings 20, 20 attached to the carrier near the ends of the latter, and provided with laterally directed hollow lugs 21 which are interiorly tapered to fit over tapered pins or studs 22 that are driven into openings in the rear end of brackets 23, 23, suitably supported on the vehicle. The said fittings 21 are confined on said tapered pins or studs by screw bolts 24, 24 screw-threaded into axial openings in the tapered pins or studs 22. The said brackets, as herein shown, constitute, in addition to their function as tire carrier supporting brackets, spring clip ties 26 which are fitted to the upper sides of the upper members 12 of the three-quarter elliptical springs, and are clamped to the frame members 13 of the car body by the clamping bolts 29 which extend through lateral lugs 28 of said ties and through flanged fittings 30 attached to the frame of the car body. The flanged fittings 30 and bolts 29 correspond to the usual spring or axle clips the side members of which comprising, as herein shown, the bolts 29, are tied together by the members 26. As shown in Figs. 1 and 2, the said brackets 23 extend upwardly and rearwardly from the clip tie portions 26 thereof and terminate in the reduced tapered portions or studs 22 over which the lugs 21 of the fittings 20 of the tire carrier engage. The brackets 23 shown in Figs. 1 and 2, are adapted to a form of motor vehicle having a short body, and extend sharply upwardly from their clip tie portions 26 and thence rearwardly.

In Fig. 3 is shown a combined clip tie and carrier supporting bracket comprising the tie portion 33 and the integral rearwardly extending bracket portion 34 which is reduced and tapered at its rear end 35 to engage the tire carrier fittings 20. The form of combined bracket and spring clip tie shown in Fig. 3 is designed for motor vehicles having long or overhanging tonneau bodies. Either or both of the combined spring clip ties and tire brackets may be provided with laterally directed lugs 37, shown best in Figs. 1 and 2, adapted to receive the screw-threaded ends of fender irons 38 to support the rear ends of fenders 40, as shown in Fig. 1.

The tire carrier bracket may be arranged to carry a tail lamp or combined tail lamp and license sign bracket, such as is shown in Figs. 1 and 4, it being attached to the carrier bracket by the screw bolt 24, as shown in Fig. 1. Said tail lamp bracket comprises, in addition to its attaching member 60 that is apertured to receive the screw bolt 24, an upstanding lug 62 to which the tail lamp or lamp and license sign is adapted to be directly attached. The said lamp and license sign bracket constitutes, in itself, no part of the present invention, but constitutes the subject matter of an application filed by me of even date herewith, Serial No. 716,904. Instead of extending the socket of the bracket rearwardly to receive the tire carrier attaching stud, I may provide the bracket 68, shown in Fig. 5, with the head 69 having a vertically arranged socket to receive the stud 72 which extends upwardly therefrom and over which is engaged the lugs 70 of the tire carrier 71. The said stud 72 is herein shown as tapered toward both ends from its center and is provided at its upper and lower ends with nuts 73, 74 screw-threaded to the ends of said stud. In this construction the weight of the tire carrier is supported more directly on the bracket 68. When a lamp or lamp and license sign bracket 75 is to be attached to and carried by the tire bracket, it may be fitted over the upper end of the stud 72 and confined thereon by the nut 74, as shown in said Fig. 5.

I claim as my invention:—

1. The combination with a tire carrier equipped with an attaching fitting, of a bracket, one end of which is shaped to constitute a spring clip tie adapted to be clamped upon the rear spring of the vehicle and means for fastening the said fitting to the other end of said bracket.

2. The combination with a tire carrier equipped with attaching fittings, of members comprising clip tie portions adapted to be fitted to the springs of a vehicle and integral, rearwardly extending bracket portions and means whereby said fittings are attached to and carried by said bracket portions.

3. The combination with a tire carrier equipped with an attaching fitting, of a bracket, one end of which is shaped to constitute a spring clip tie adapted to be clamped upon the rear spring of the vehicle and means for fastening the said fitting to the other end of said bracket, said bracket being provided at the clip tie portion with a lug and a fender iron extending through said lug.

4. A bracket for supporting a tire carrier upon a vehicle, said bracket being flanged at its forward end to be applied to the vehicle spring, and having means at its flanged portion to coöperate with the same fastening means which attach the rear spring to the vehicle frame, whereby the bracket is fastened in place, said bracket having an integral, rearwardly extending portion provided with means to support a tire carrier.

5. A combined spring clip tie and tire carrier bracket comprising a clip tie portion adapted to be fitted over and clipped to a vehicle spring, and an integral, rearwardly extending portion having means at its end to support a tire carrier, said clip tie portion being provided with a lateral lug adapted to receive a fender iron to thereby support a portion of the vehicle fender.

6. A combined spring clip tie and tire carrier bracket comprising a clip tie portion adapted to be fitted over and clipped to a vehicle spring, an integral, rearwardly extending portion, provided with a socket and a stud fitted in said socket to receive and support a tire carrier.

7. A combined spring clip tie and tire carrier bracket comprising a clip tie portion adapted to be fitted over and clipped to a vehicle spring, an integral, rearwardly extending portion, provided with a socket and a stud fitted in the socket, combined with a hollow carrier bracket fitted over said stud and means for confining said bracket on said stud.

8. A tire carrier supporting bracket comprising a part adapted to be fastened to a vehicle, a rearwardly extending portion having a stud, and screw-threaded means engaging said stud to fasten a tire carrier thereto.

In witness whereof I claim the foregoing as my invention I affix my signature in the presence of two witnesses, this 20th day of August, 1913.

THOMAS I. DUFFY.

Witnesses:
G. E. DOWLE,
W. L. HALL.